United States Patent
Gao et al.

(10) Patent No.: US 10,921,493 B2
(45) Date of Patent: Feb. 16, 2021

(54) VIRTUAL CURVED SURFACE DISPLAY PANEL, DISPLAY DEVICE AND DISPLAYING METHOD

(71) Applicant: BOE Technology Group Co., Ltd., Beijing (CN)

(72) Inventors: Jian Gao, Beijing (CN); Xiaochuan Chen, Beijing (CN); Yafeng Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 430 days.

(21) Appl. No.: 15/747,551

(22) PCT Filed: Jul. 20, 2017

(86) PCT No.: PCT/CN2017/093697
§ 371 (c)(1),
(2) Date: Jan. 25, 2018

(87) PCT Pub. No.: WO2018/045832
PCT Pub. Date: Mar. 15, 2018

(65) Prior Publication Data
US 2018/0372924 A1    Dec. 27, 2018

(30) Foreign Application Priority Data
Sep. 7, 2016    (CN) .......................... 2016 1 0809447

(51) Int. Cl.
*G02B 3/08*    (2006.01)
*G02B 26/00*    (2006.01)
(Continued)

(52) U.S. Cl.
CPC ........... *G02B 3/005* (2013.01); *G02B 3/0037* (2013.01); *G02F 1/133526* (2013.01); *G02F 1/13471* (2013.01)

(58) Field of Classification Search
CPC ........... G02F 2001/3503; G02F 1/0311; G02F 1/133256; G02B 3/0056; G02B 3/0062;
(Continued)

(56) References Cited

U.S. PATENT DOCUMENTS

2016/0195646 A1    7/2016    Su et al.

FOREIGN PATENT DOCUMENTS

CN    103091854 A    5/2013
CN    104464523 A    3/2015
(Continued)

OTHER PUBLICATIONS

International Search Report and English translation of international Search Report for International Application No. PCT/CN2017/093697, dated Oct. 11, 2017, 8 pages.
(Continued)

*Primary Examiner* — Dawayne Pinkney
(74) *Attorney, Agent, or Firm* — Westman, Champlin & Koehler, P.A.

(57) ABSTRACT

Embodiments of the disclosure provide a virtual curved surface display panel, a display device and a displaying method. The virtual curved surface display panel includes: a display panel having a plurality of pixels; and a plurality of imaging lens arrays disposed at a light emitting side of the display panel and arranged to image light from the plurality of pixels such that imaging trajectories for the plurality of pixels are located in a same virtual curved surface, thereby enabling a virtual curved surface display effect on a flat display panel.

20 Claims, 10 Drawing Sheets

(51) Int. Cl.
  *G02B 27/22*   (2018.01)
  *G02B 27/10*   (2006.01)
  *G02B 27/14*   (2006.01)
  *G02F 1/1335*  (2006.01)
  *G02B 3/00*    (2006.01)
  *G02F 1/1347*  (2006.01)

(58) Field of Classification Search
  CPC .............. G02B 3/0068; G02B 27/0961; G02B 27/2214
  USPC ... 359/741, 743, 648, 754, 13–14, 237, 462, 359/466, 454–456, 618–619, 621, 630; 349/57, 95
  See application file for complete search history.

(56) References Cited

FOREIGN PATENT DOCUMENTS

| | | |
|---|---|---|
| CN | 105572930 A | 5/2016 |
| CN | 105842905 A | 8/2016 |
| CN | 106125394 A | 11/2016 |
| CN | 205992104 U | 3/2017 |
| KR | 20090056032 A | 6/2009 |

OTHER PUBLICATIONS

Written Opinion and English translation of Box No. 5 of Written Opinion for international Application No. PCT/CN2017/093697, dated Oct. 11, 2017, 7 pages.

VIRTUAL CURVED SURFACE DISPLAY PANEL, DISPLAY DEVICE AND DISPLAYING METHOD

CROSS-REFERENCE TO RELATED APPLICATION

This application is a Section 371 National Stage Application of International Application No. PCT/CN2017/093697, filed Jul. 20, 2017, which is not yet published, and claims the benefit of Chinese Patent Application No.201610809447.2 filed on Sep. 7, 2016 in the State Intellectual Property Office of China, the whole disclosure of which are incorporated herein by reference.

BACKGROUND OF THE DISCLOSURE

Field of the Disclosure

Embodiments of the present disclosure relate to technical field of display, and particularly to a virtual curved surface display panel, a display device and a displaying method.

Description of the Related Art

A current flat display panel has advantage of saving physical space and thus is widely used. However, due to its light distribution properties, generally intensity of light emitted from a display decreases as a viewing distance of human's eyes to the display increases from a position facing directly opposite to the display to a position at either side thereof, which brings bad viewing experience for human's eyes. This effect becomes remarkable particularly for a large-scale display. Meanwhile, a curved surface display device may bring enhanced visual effect during viewing due to its surround effect. However, the curved surface display device has disadvantages including a larger difficulty in performing a physically-curving process, a larger thickness and a heavier weight.

Thus, it is an important problem for people to study how to obtain a picture displaying effect on a virtual curved surface by a flat display panel.

SUMMARY

Embodiments of the disclosure provide a virtual curved surface display panel, a display device and a displaying method, for obtaining a picture displaying effect on a virtual curved surface by a flat display panel.

In an aspect, an embodiment of the present disclosure provides a virtual curved surface display panel, comprising:
 a display panel having a plurality of pixels; and
 a plurality of imaging lens arrays disposed at a light emitting side of the display panel and arranged to image light from the plurality of pixels such that imaging trajectories for the plurality of pixels are located in a same virtual curved surface.

In some embodiments, the imaging lens arrays comprise convex lens arrays each comprising a plurality of convex lenses; object distances from the plurality of convex lens arrays to the display panel are distributed in a stepped shape being symmetrical about a vertical central axis of the display panel; the convex lenses that are located at either side of the vertical central axis and spaced from the vertical central axis by a same distance have a same focal distance and the focal distances of the convex lenses that are spaced from the vertical central axis by different distance are different from one another; and the focal distances of the plurality of convex lens arrays increase as object distances of the plurality of convex lens from the display panel increase.

In some embodiments, the convex lenses that are located at center positions of respective convex lens arrays have a same magnification ratio.

In some embodiments, the object distances of the plurality of convex lens arrays from the display panel decrease as distances of the plurality of convex lens arrays from the vertical central axis increase.

In some embodiments, the object distance of each of the convex lenses from the display panel is smaller than the focal distance of the convex lens.

In some embodiments, the object distances of the plurality of convex lens arrays from the display panel increase as distances of the plurality of convex lens arrays from the vertical central axis increase.

In some embodiments, the object distance of each of the convex lenses from the display panel is larger than the focal distance of the convex lens and smaller than two times of the focal distance of the convex lens.

In some embodiments, the focal distances of the convex lens of each of the convex lens arrays increase sequentially as distances of the convex lens from the vertical central axis increase.

In some embodiments, each of the convex lens arrays corresponds to at least one of the pixels in the display panel.

In some embodiments, each pixel of the display panel corresponds to one of the convex lenses of the convex lens arrays.

In some embodiments, the object distance between each of the convex lenses and the display panel is less than the focal distance of the convex lenses, such that for pixels corresponding to one same convex lens array, a ratio of a width, measured in a direction perpendicular to the vertical central axis, of the pixel to a width, measured in the direction, of a black matrix at either side of the pixel increases as a distance of the pixel from the vertical central axis increases.

In some embodiments, the object distance between each of the convex lenses and the display panel is greater than the focal distance of the each of the convex lenses, such that for pixels corresponding to one same convex lens array, a ratio of a width, measured in a direction perpendicular to the vertical central axis, of the pixel to a width, measured in the direction, of a black matrix at either side of the pixel decreases as a distance of the pixel from the vertical central axis increases.

In some embodiments, each of the pixels in the display panel comprises a plurality of sub-pixels each corresponding to at least one of the convex lenses in the convex lens array.

In some embodiments, the number of the convex lenses corresponding to each of the sub-pixels is less than or equal to eight.

In some embodiments, the convex lenses corresponding to the sub-pixels in one same pixel have a same focal distance.

In some embodiments, the imaging lens array comprises a liquid crystal lens, which is equivalent to one or more of the convex lenses arrays in a state of being applied with a voltage.

In another aspect, an embodiment of the present disclosure provides a display device comprising the virtual curved surface display panel provided in any of embodiments of the present disclosure.

In a further aspect, an embodiment of the present disclosure provides a method for performing virtual curved surface display of a display panel, the method comprising:

providing a plurality of imaging lens arrays at a light emitting side of the display panel having a plurality of pixels; and during displaying of the display panel, controlling object distances of the plurality of imaging lens arrays from the display panel and focal distances of the plurality of imaging lens arrays so as to image light from the plurality of pixels such that imaging trajectories of the pixels in the display panel are located in a same virtual curved surface.

In some embodiments, in the method for performing virtual curved surface display of a display panel, the step of providing a plurality of imaging lens arrays at a light emitting side of the display panel having a plurality of pixels comprises providing a plurality of convex lens arrays or a liquid crystal lens equivalent to a convex lens array at the light emitting side of the display panel having the plurality of pixels.

In some embodiments, in the method for performing virtual curved surface display of a display panel, the plurality of convex lens arrays are arranged such that each of the convex lens arrays comprises a plurality of convex lenses, object distances of the plurality of convex lens arrays to the display panel are distributed in a stepped shape being symmetrical about a vertical central axis of the display panel, convex lenses that are located at either side of vertical central axis and spaced from the vertical central axis by a same distance have a same focal distance, and focal distances of the convex lenses that are spaced from the vertical central axis by different distances are different from one another.

In some embodiments, in the method for performing virtual curved surface display of a display panel, the plurality of convex lens arrays are arranged such that focal distances of the plurality of convex lens arrays increase sequentially as object distances of the plurality of convex lens arrays from the display panel increase.

DETAILED DESCRIPTION OF EMBODIMENTS

Embodiments of the present disclosure provide a virtual curved surface display panel, a display device and a displaying method, for obtaining a picture displaying effect on a virtual curved surface by a flat display panel.

In order to make objects, technical schemes and advantages of the present disclosure more definite, the present disclosure will be described in detail hereinafter with reference to drawings. Obviously, the described embodiments are merely a part of embodiments of the present disclosure, rather than being all embodiments thereof. Based on the described embodiments of the present disclosure, all other embodiments obtained by those ordinary skilled in the art without any inventive step will fall within the scope of the present disclosure.

According to a general inventive concept of the present disclosure, there is provided a virtual curved surface display panel comprising: a display panel having a plurality of pixels; and a plurality of imaging lens arrays disposed at a light emitting side of the display panel and arranged to image light from the plurality of pixels such that imaging trajectories of the pixels are located in a same virtual curved surface, thereby enabling a display effect on a virtual curved surface by a flat display panel.

In the following, a virtual curved surface display panel, a display device and a displaying method provided by embodiments of the present disclosure will be described in detail in combination with the drawings.

Figure 1:
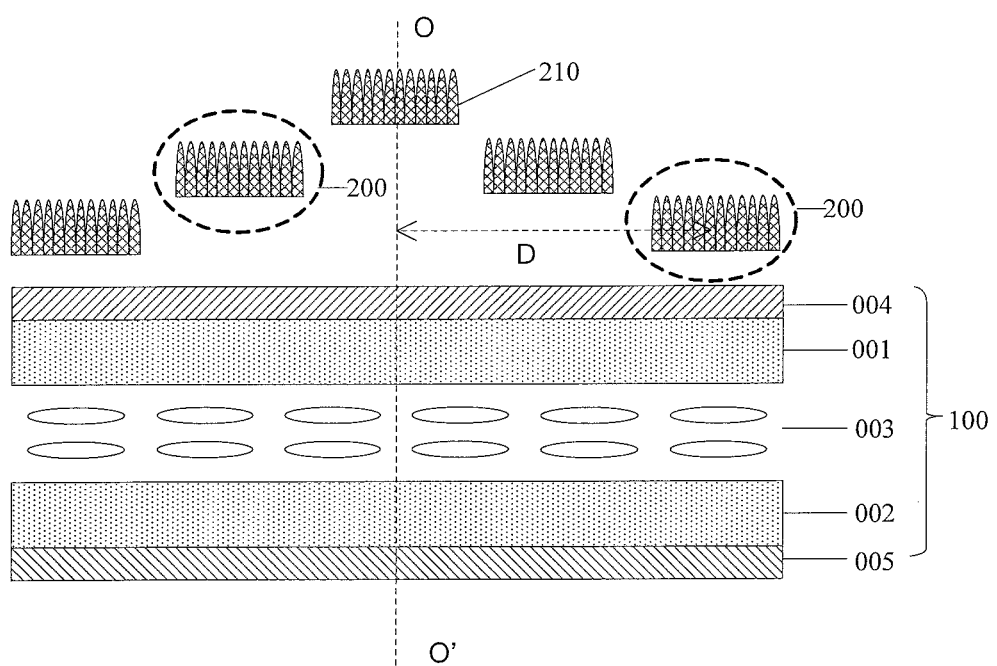
FIG. 1 is a structural schematic view of a virtual curved surface display panel according to an embodiment of the present disclosure.

As shown in FIG. 1, an embodiment of the present disclosure provides a virtual curved surface display panel comprising a display panel 100 having a plurality of pixels, and a plurality of imaging lens arrays. The plurality of imaging lens arrays are disposed at a light emitting side of the display panel 100 and arranged to image light from the plurality of pixels such that imaging trajectories of the plurality of pixels are located in a same virtual curved surface.

In some embodiments, the imaging lens arrays include convex lens arrays 200 each including a plurality of convex lenses 210;

object distances from the plurality of convex lens arrays 200 to the display panel 100 are distributed in a stepped shape being symmetrical about a vertical central axis O-O' (i.e., a central axis perpendicular to the light emitting surface of the display panel) of the display panel 100; the convex lenses 210 that are located at either side of and spaced from the vertical central axis by a same distance D have a same focal distance, and focal distances of the convex lenses 210 that are spaced from the vertical central axis by different distances are different from one another;

the focal distance of the convex lens array 200 increases as the object distance of the convex lens array 200 from the display panel 100 increases.

It is noted that the focal distance of the above convex lens array means a whole focal distance of the convex lens array and reflects a whole trend of focal distances of respective convex lens arrays, and each of the convex lens arrays has a plurality of convex lenses each having its own focal distance. When a whole focal distance of a convex lens array is greater than that of another convex lens array, for example, a whole focal distance of a convex lens array A is greater than that of a convex lens array B, a minimum one of focal distances of convex lenses in the convex lens array A is still greater than a maximum one of focal distances of convex lenses in the convex lens array B. In addition, in an object-image coordinate system of a convex lens, an object distance is commonly presented at a negative half axis of the coordinate system and thus is a negative number. However, the term "object distance" or "image distance" described in the present disclosure is directed to a physical distance having a value being an absolute value of an object distance or an image distance in the object-image coordinate system. In practice, the type of the display panel in the virtual curved surface display panel provided by embodiments of the disclosure is not limited herein, and may be a flat display panel, such as a liquid crystal display panel, an electroluminescence display panel, a plasma display panel or electronic paper.

Illustration is made by an example of a display panel 100 as shown in FIG. 1 that is a liquid crystal display panel. In the example, the liquid crystal display panel includes an upper substrate 001 and a lower substrate 002 opposite to each other, a liquid crystal layer 003 between the upper substrate 001 and the lower substrate 002, an upper polarizer sheet 004 disposed above (for example, attached to) the upper substrate 001, and a lower polarizer sheet 005 disposed below (for example, attached to) the lower substrate 002. A side of the upper polarizer sheet 004 is used as a display face, that is, a light emitting face, of the liquid crystal display panel, and a convex lens array 200 is provided at a side of the upper polarizer sheet 004 facing away from the liquid crystal layer. Light emitted from a backlight module passes through and is modulated by the liquid crystal layer 003, emitted out of the side of the upper polarizer sheet 004, and then is refracted by the convex lenses 210 having different focal distances in the convex lens array 200 so as to form an image.

The focal distances of the convex lenses in the convex lens array are adjusted so as to obtain different image distances for images formed by the pixels in the display panel, such that imaging trajectories or positions of the pixels are arranged in a same curved surface (a virtual curved surface) or, imaging trajectories or positions for the pixels are located in the same virtual curved surface. The whole focal distance of the convex lens array increases as a distance of the convex lens array from the display panel increase, thus in some embodiment, the convex lens arrays may be kept to have a similar magnification ratio to avoid distortion of a displayed picture caused due to overlarge difference among the magnification ratios for different displaying picture regions, thereby improving display effect, achieving a picture displaying effect in a virtual curved surface by a flat display panel and enhancing a visual impact during watching.

In practice, a plurality of convex lenses in a same convex lens array cannot have the same magnification ratio when they have the same object distance. In order to ensure the convex lens arrays 200 have similar magnification ratios, the convex lenses in respective central positions of the convex lens arrays 200 may be configured to have a same magnification ratio.

Figure 2A:
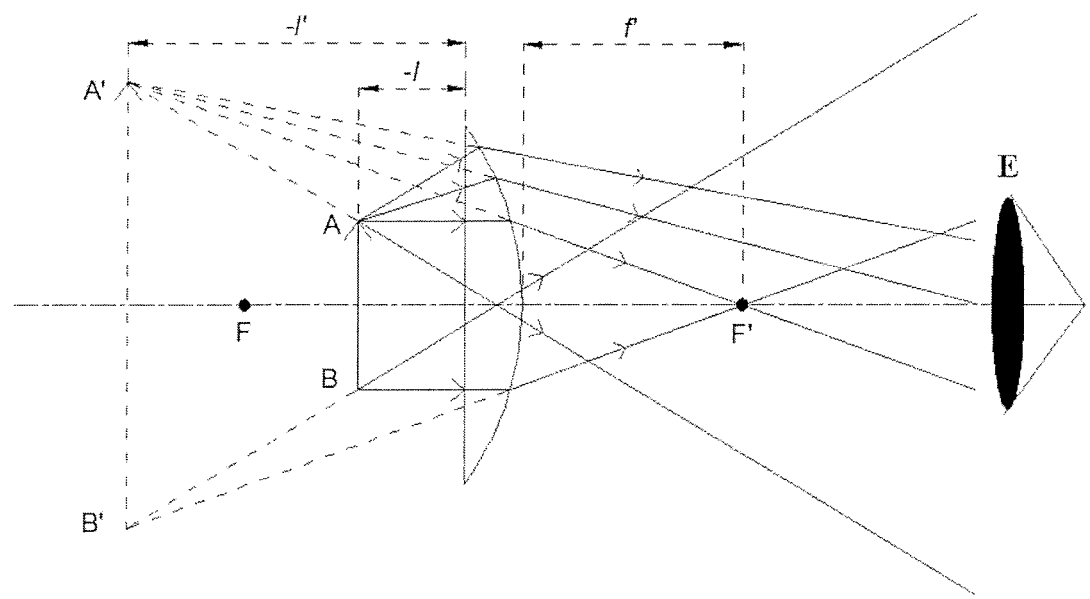
FIG. 2a is a schematic view showing a working principle of formation of a virtual image by a convex lens.
Figure 2B:
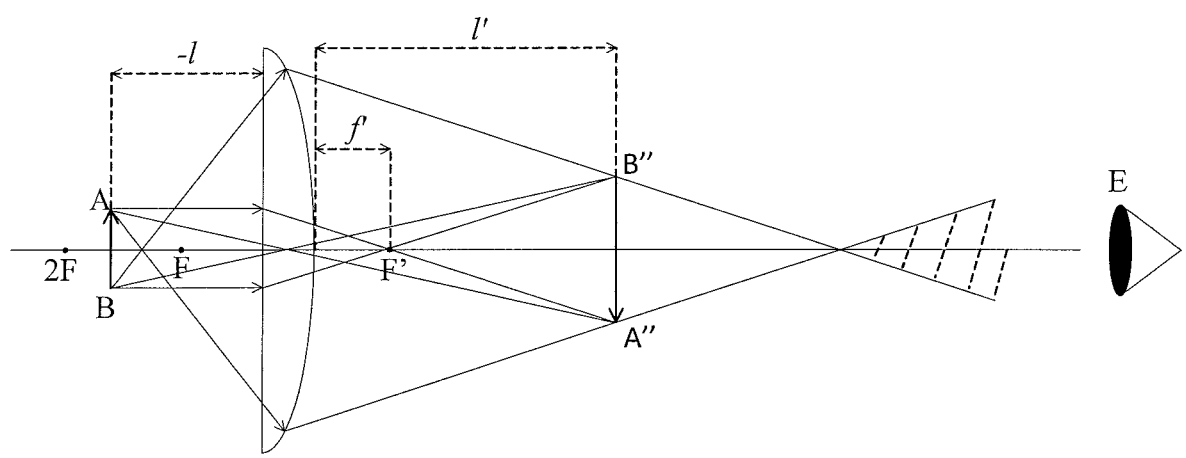
FIG. 2b is a schematic view showing a working principle of formation of a real image by a convex lens.

In the virtual curved surface display panel according to an embodiment of the present disclosure, on one hand, as shown in FIG. 2a, according to a virtual image imaging principle of a convex lens, when an object AB (for example, an image displayed by a pixel) is placed at a position where an object distance l is less than a focal distance f', an amplified virtual image A'B' of the object AB may be viewed by human's eyes and the formed virtual image A'B' is located at the same side of the convex lens as the object AB, thereby achieving a back-position virtual curved display effect relative to the display panel. On the other hand, as shown in FIG. 2b, the object AB (for example, an image displayed by a pixel) is placed at a position where the object distance l is greater than a focal distance f' but less than two times of focal distance 2f', an amplified real image A"B" of the object AB may be viewed and the real image A"B" and the object AB are respectively located at either side of the convex lens, thereby achieving a picture displaying effect in a front-position virtual curved surface relative to the display panel.

Basis formulas for an optical system are presented as below:

1. A relationship between an object distance and an image distance is defined as $$\frac{1}{l'} - \frac{1}{l} = \frac{1}{f'}; \tag{1}$$

and

2. A vertical axis magnification ratio is defined as $$\beta = \frac{l'}{l}. \tag{2}$$

It is known from the above formulas of an optical system that, when a magnification ratio β of a convex lens is constant, a ratio of an image distance l' to an object distant l is constant, that is, the image distance l' and the object distant l vary at the same trend, i.e., the object distance l will increase when the image distance l' increases. Based on this principle, the object distances of the convex lens arrays may be adjusted such that images formed by the convex lens arrays that have different image distances may constitute a curved surface, so as to achieve a picture displaying effect in a virtual curved surface by a flat display panel while maintaining the magnification ratios of the convex lens arrays to be substantively the same.

Figure 3A:
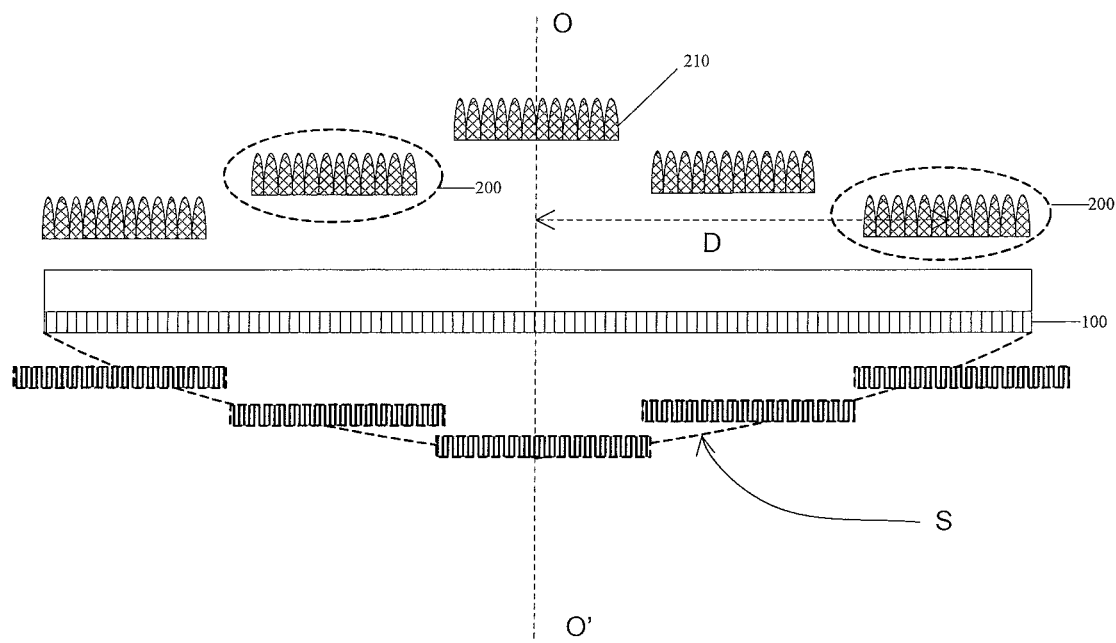
FIG. 3a is a structural schematic view of a virtual curved surface display panel according to an embodiment of the present disclosure when achieving a back-position virtual curved surface display.
Figure 3B:
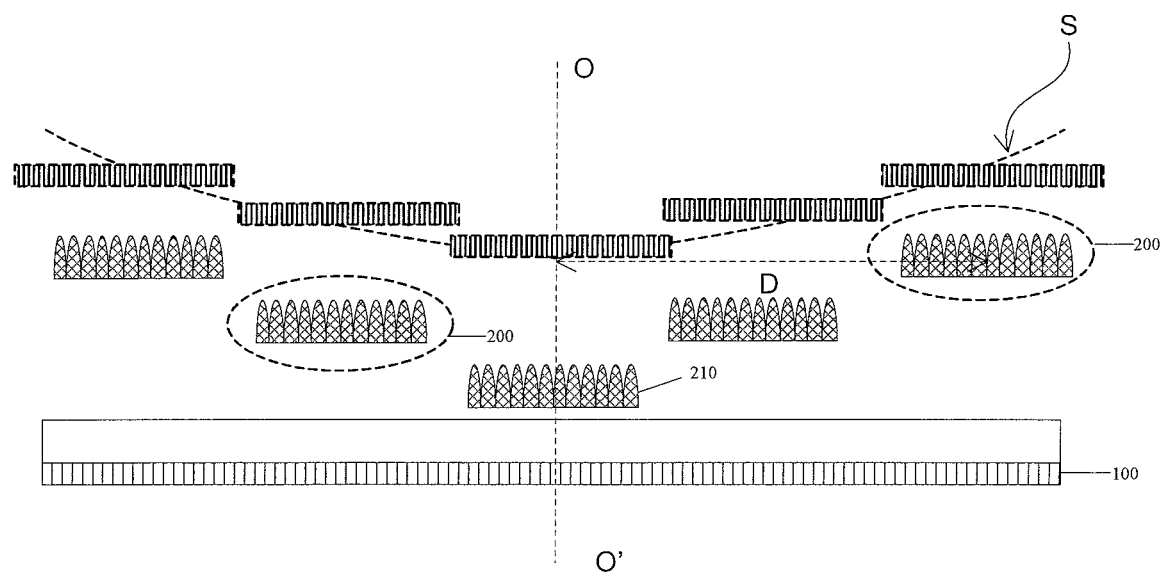
FIG. 3b is a structural schematic view of a virtual curved surface display panel according to an embodiment of the present disclosure when achieving a front-position virtual curved surface display.

In some embodiments, as shown in FIG. 3a and FIG. 3b, the object distances between the convex lens arrays 200 and the display panel 100 may be provided in two situations below according to display positions of the virtual curved surface. As shown in FIG. 3a, the object distance from the convex lens array 200 to the display panel 100 decreases as the distance D from the convex lens array 200 to the vertical central axis O-O' increases. Alternatively, as shown in FIG. 3b, the object distance from the convex lens array 200 to the display panel 100 increases as of the distance D from the convex lens array 200 to the vertical central axis O-O' increases.

When positions of the convex lens arrays 200 are arranged in the manner as shown in FIG. 3a, as the virtual curved surface S is located at the side of the display panel 100 facing away from the convex lens array 200 and opens toward the display panel 100, the object distance l between the convex lens 210 and the display panel 100 is less than the focal distance f' of the convex lens 210.

When positions of the convex lens arrays 200 are arranged in the manner as shown in FIG. 3b, as the virtual curved surface S is located at the same side of the display panel 100 as the convex lens array 200 and opens away from the display panel 100, the object distance l between the convex lens 210 and the display panel 100 is greater than a focal distance f' of the convex lens 210 but less than two times of the focal distance f'.

Figure 4A:
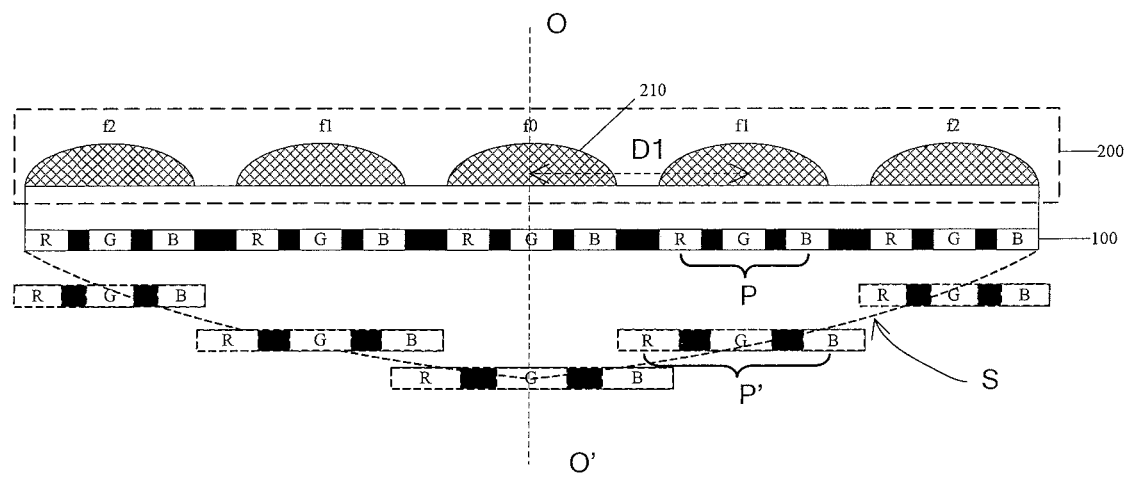
FIG. 4a is a schematic view showing an interior arrangement of a convex lens array when a virtual curved surface display panel according to an embodiment of the present disclosure achieves a back-position virtual curved surface display.
Figure 4B:
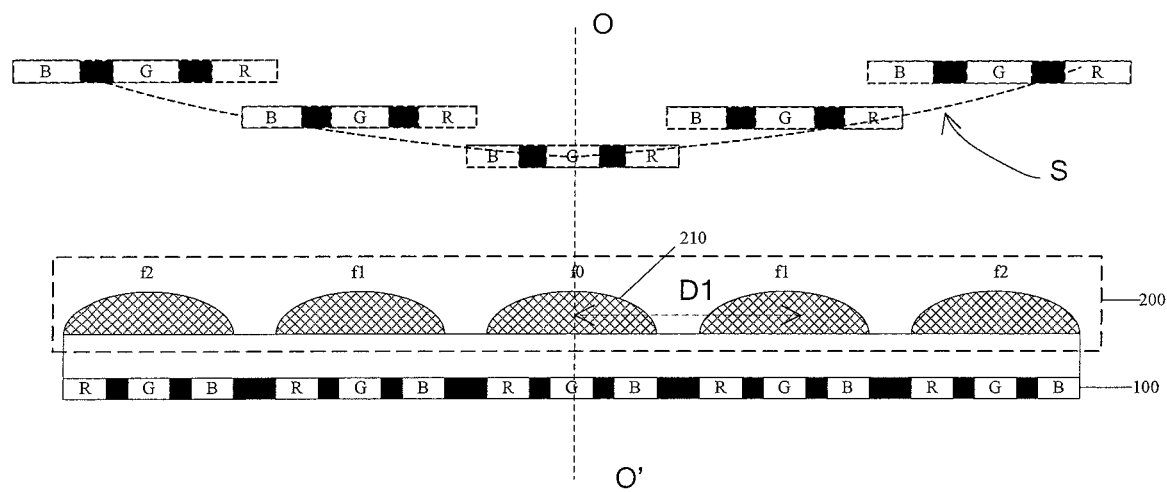
FIG. 4b is a schematic view showing an interior arrangement of a convex lens array when a virtual curved surface display panel according to an embodiment of the present disclosure achieves a front-position virtual curved surface display.

In practice, no matter which configuration manner shown in FIG. 3a or FIG. 3b is implemented, a focal distance f' of a convex lens 210 in each convex lens array increases as a distance from the convex lens to the vertical central axis increases. For example, local views illustrating a convex lens array 200 and the corresponding display regions are shown respectively in FIG. 4a and FIG. 4b. The convex lenses 210 at central positions of the convex lens arrays 200 as shown in FIG. 4a and FIG. 4b have focal distances f0, f1 and f2 respectively. The focal distance f0 of the convex lens at the central position is less than the focal distances f1 and f2 of the convex lenses that are respectively located at either side thereof. The focal distances of the convex lenses 210 are arranged symmetrically about the vertical central axis O-O' and the convex lenses that are spaced from the vertical central axis O-O' by a same distance D1 have a same focal distance. As the distance from the convex lens to the vertical central axis O-O' increases, the focal distances of the convex lenses are defined as f2>f1>f0. When the focal distances of the convex lenses 210 in the convex lens array 200 are configured in the above manner, the imaging trajectory of the pixels corresponding to the convex lenses has a whole trend in conformity with a virtual cured surface.

In some embodiments, each convex lens array 200 corresponds to at least one pixel in the display panel 100, for example, each convex lens array 200 is aligned with or overlaps in position at least one pixel in the display panel 100 in a direction of the vertical central axis.

In some embodiments, each pixel P (each pixel comprises sub-pixels R, G, B) of the display panel 100 corresponds to one convex lens 210 of the convex lens array 200, for example, each pixel is aligned with or overlaps in position one convex lens in a direction of the vertical central axis.

In some embodiments, each convex lens array 200 corresponds to a portion of a display region, in which a plurality of pixels P are included, of the display panel 100. As shown in FIG. 4a and FIG. 4b, in a portion of the display region corresponding to one convex lens array 200, each convex lens 210 corresponds to one pixel P. For example, each convex lens 210 is aligned with or overlaps in position one pixel P in the direction of the vertical central axis.

In an embodiment where the arrangement manner as shown in FIG. 4a is implemented, a picture displaying effect in a back-position virtual curved surface relative to display panel 100 may be achieved. In an embodiment where the arrangement manner as shown in FIG. 4b is implemented, a picture displaying effect in a front-position virtual curved surface relative to display panel 100 may be achieved. No matter which configuration manner shown in FIG. 4a or FIG. 4b is implemented, the focal distances of the convex lenses 210 may be defined as f0<f1<f2.

However, when a one-to-one correspondance configuration between the pixels P and the convex lenses 210 is implemented, regardless of an image formed by the pixels being a virtual image or a real image, the formed amplified images P' for the pixels P respectively overlap each other, as shown in FIG. 4a and FIG. 4b, which will causes image distortion of the picture displayed in the virtual curved surface S. As such, a plurality of approaches may be implemented to relieve overlap of the images so as to solve the problem of image distortion.

Figure 5A:
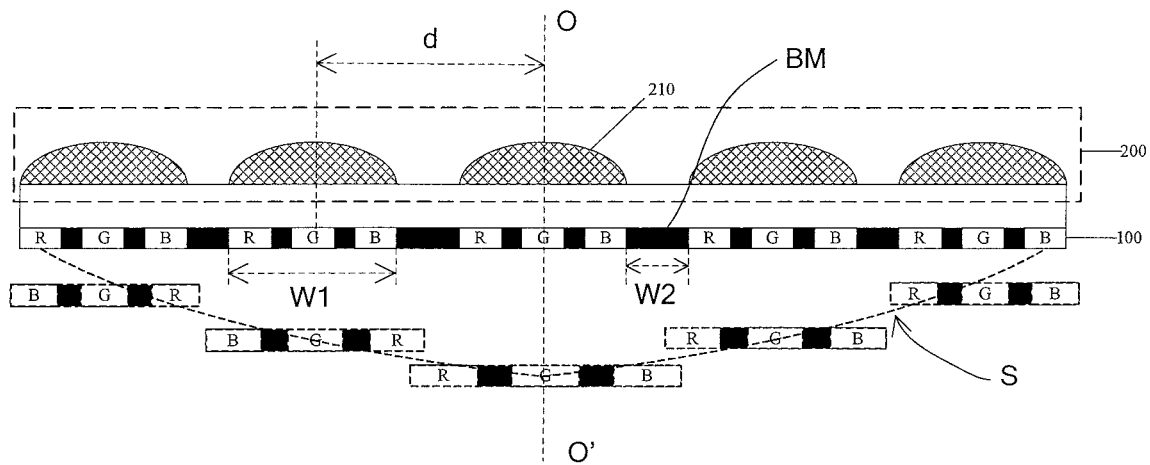
FIG. 5a is a schematic view showing an interior arrangement of a convex lens array when a virtual curved surface display panel according to another embodiment of the present disclosure achieves a back-position virtual curved surface display.

In some embodiments, for pixels corresponding to one convex lens array, a ratio of a width, measured in a direction perpendicular to the vertical central axis, of the pixel to a width, measured in the direction, of a black matrix at either side of the pixel is adjusted. FIG. 4a and FIG. 4b respectively illustrate arrangements of the convex lenses in one convex lens array. As shown in FIG. 4a, when the object distance l from the convex lens 210 to the flat display panel 100 is less than a focal distance f' of the convex lens 210, as the focal distance f' of the convex lens 210 increases as the distance D1 from the convex lens 210 to the vertical central axis O-O' increase, it is known from the above formula (2) that a magnification ratio for a pixel P decreases as the distance from the pixel to the vertical central axis increase, i.e., imaging magnification ratio for the pixel P is maximum at a central position and is minimum at an edge position. As such, images formed at the central positions have most overlap and images formed at edge position have least overlap. Accordingly, as shown in FIG. 5a, the ratio of the width, measured in a direction perpendicular to the vertical central axis, of a pixel P to the width, measured in the direction perpendicular to the vertical central axis, of a black matrix BM at either side of the pixel P, is configured to increase as the distance d from the pixel P to the vertical central axis O-O' increases. Specifically, the width W1, measured in the direction perpendicular to the vertical central axis O-O', of a pixel P is configured to increase as the distance d from the pixel P to the vertical central axis O-O' increases. Alternatively, as shown in FIG. 5a, the width W2, measured in the direction perpendicular to the vertical central axis O-O', of a black matrix BM between the pixels P is configured to decrease as the distance d from the pixel P to the vertical central axis O-O' increases.

Figure 5B:
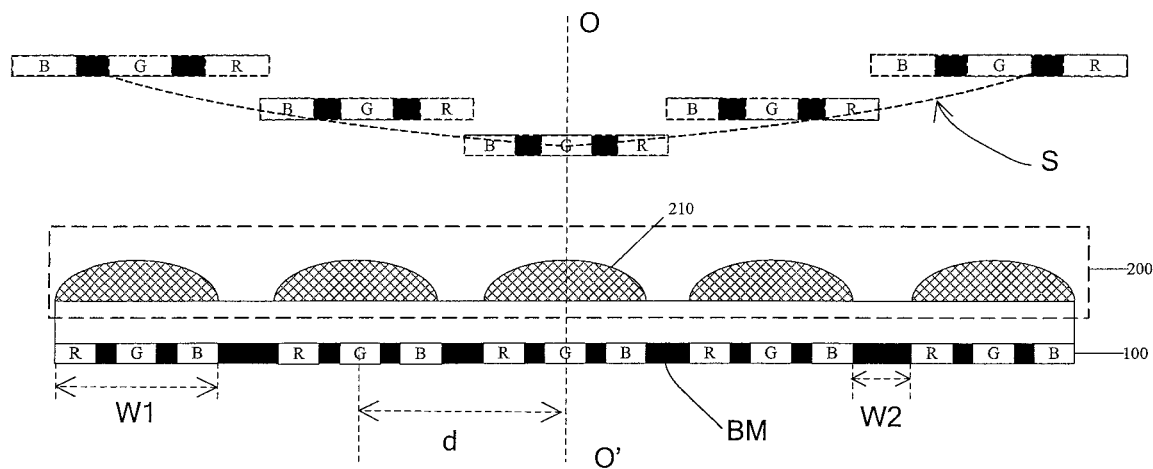
FIG. 5b is a schematic view showing an interior arrangement of a convex lens array when a virtual curved surface display panel according to a still embodiment of the present disclosure achieves a front-position virtual curved surface display.

In the embodiment as shown in FIG. 4b where the object distance l from a convex lens 210 to the flat display panel 100 is greater than a focal distance and less than two times of the focal distance f', as the focal distance f' of a convex lens 210 increases as a distance from the convex lens 210 to the vertical central axis increases, it is known from the above formula (2) that imaging amplification for a pixel P increases the distance from the pixel to the vertical central axis increase, i.e., an imaging magnification ratio is minimum at a central position and is maximum at an edge position, and thus images formed at the central position have least overlap and images formed at edge position have most overlap. Accordingly, as shown in FIG. 5b, the ratio of the width, measured in a direction perpendicular to the vertical central axis, of a pixel P to the width, measured in the direction perpendicular to the vertical central axis, of a black matrix BM at either side of the pixel P, is configured to decrease as the distance d from the pixel P to the vertical central axis O-O' increases. Specifically, the width W1, measured in the direction perpendicular to the vertical central axis O-O', of a pixel P is configured to decrease as the distance d from the pixel P to the vertical central axis O-O' increases. Alternatively, as shown in FIG. 5b, the width W2, measured in the direction perpendicular to the vertical central axis O-O', of a black matrix BM between the pixels P is configured to increase as the distance d from the pixel P to the vertical central axis O-O' increases.

With the above configurations, an amplified virtual image of a pixel may not overlap that of another pixel or may overlap as less portion as possible of that of another pixel, so as to improve picture displaying effect of the virtual curved surface display.

Figure 6A:
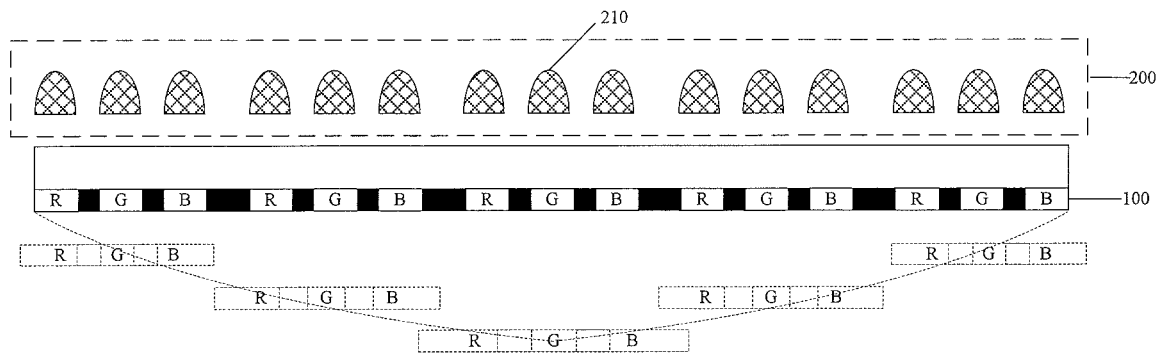
FIG. 6a is a structural schematic view of a virtual curved surface display panel according to a further embodiment of the present disclosure when achieving a back-position virtual curved surface display.
Figure 6B:
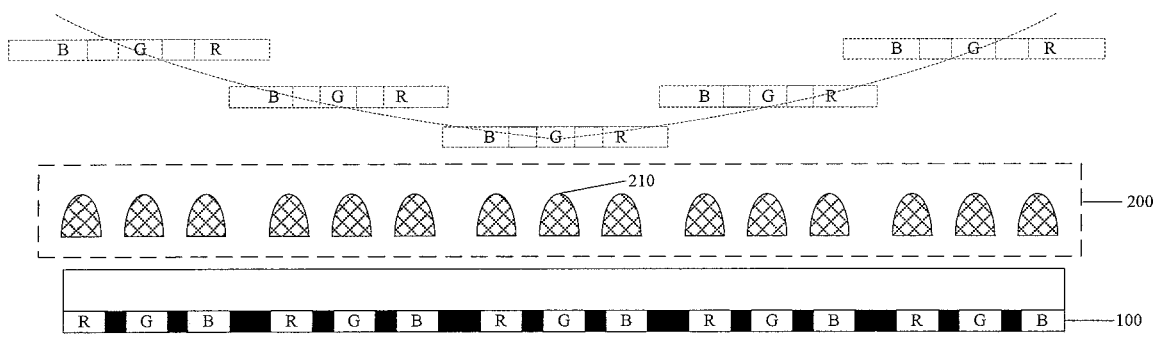
FIG. 6b is a structural schematic view of a virtual curved surface display panel according to a still further embodiment of the present disclosure when achieving a front-position virtual curved surface display.

In some embodiment, each sub-pixel in the pixel of the display panel is configured to correspond to at least one convex lens in the convex lens array, for example, each sub-pixel is aligned with or overlaps in position at least one convex lens in the direction of the vertical central axis. As shown in FIG. 6a and FIG. 6b, the convex lenses 210 are respectively in one-to-one correspondence to sub-pixels R, G, B constituting a pixel. For example, each convex lens 210 is aligned with or overlaps one corresponding sub-pixel in the direction of the vertical central axis. In this instant, one convex lens 210 corresponds to one sub-pixel R, G or B. In some examples, the convex lenses 210 corresponding to a same pixel 210 have a same focal distance. With this configuration, the amplified images of the sub-pixels R, G, and B of each pixel P at least partially overlap with one another while the images of adjacent pixels have no overlap with one another or a little overlap due to the black matrix. Overlapping among the amplified images of the sub-pixels R, G, and B will not adversely affect display and on the contrary, is favor of modulation of color of the picture and indirectly increases aperture ratio of the display pixel.

Figure 7A:
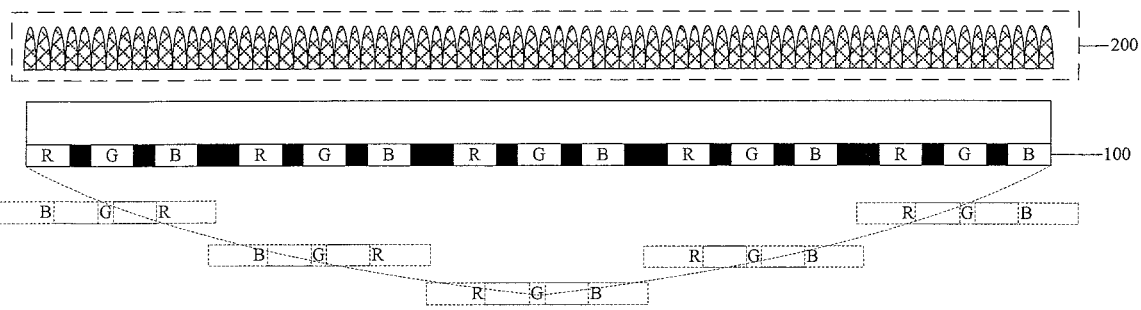
FIG. 7a is a structural schematic view of a virtual curved surface display panel according to a yet further embodiment of the present disclosure when achieving a back-position virtual curved surface display.
Figure 7B:
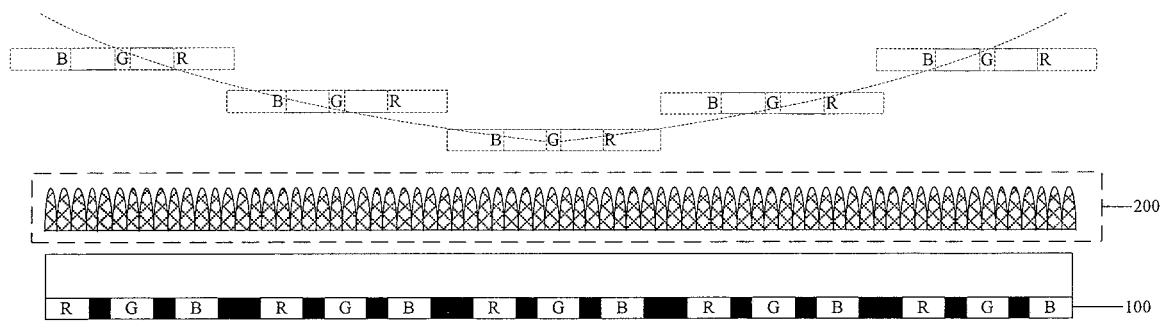
FIG. 7b is a structural schematic view of a virtual curved surface display panel according to a yet another embodiment of the present disclosure when achieving a front-position virtual curved surface display.

In some embodiments where a plurality of convex lenses are arranged to correspond to one sub-pixel. As shown in FIG. 7a and FIG. 7b, sub-pixels R, G and B constituting a pixel in the display panel 100 respectively correspond to a plurality of convex lenses 210 in a convex lens array 200. In some examples, the convex lenses 210 corresponding to a same pixel have a same focal distance. With this configuration, overlap among the amplified images of the sub-pixels R, G and B of the pixel may be further reduced. For example, the sub-pixel R, G or B that constitutes a pixel may correspond to two, three or more convex lenses 210. Greater the number of the convex lenses 210 corresponding to a sub-pixel is, less the overlap among the amplified images of the pixel is. In a conventional process, a diameter of a convex lens is commonly less than 6 μm. If it is assumed a size of a sub-pixel is 51 μm, a maximum number of the convex lenses corresponding to one sub-pixel is eight. Of course, the diameter of the convex lens may be reduced such that one sub-pixel may correspond to more convex lenses, which is not limited herein.

Figure 8A:
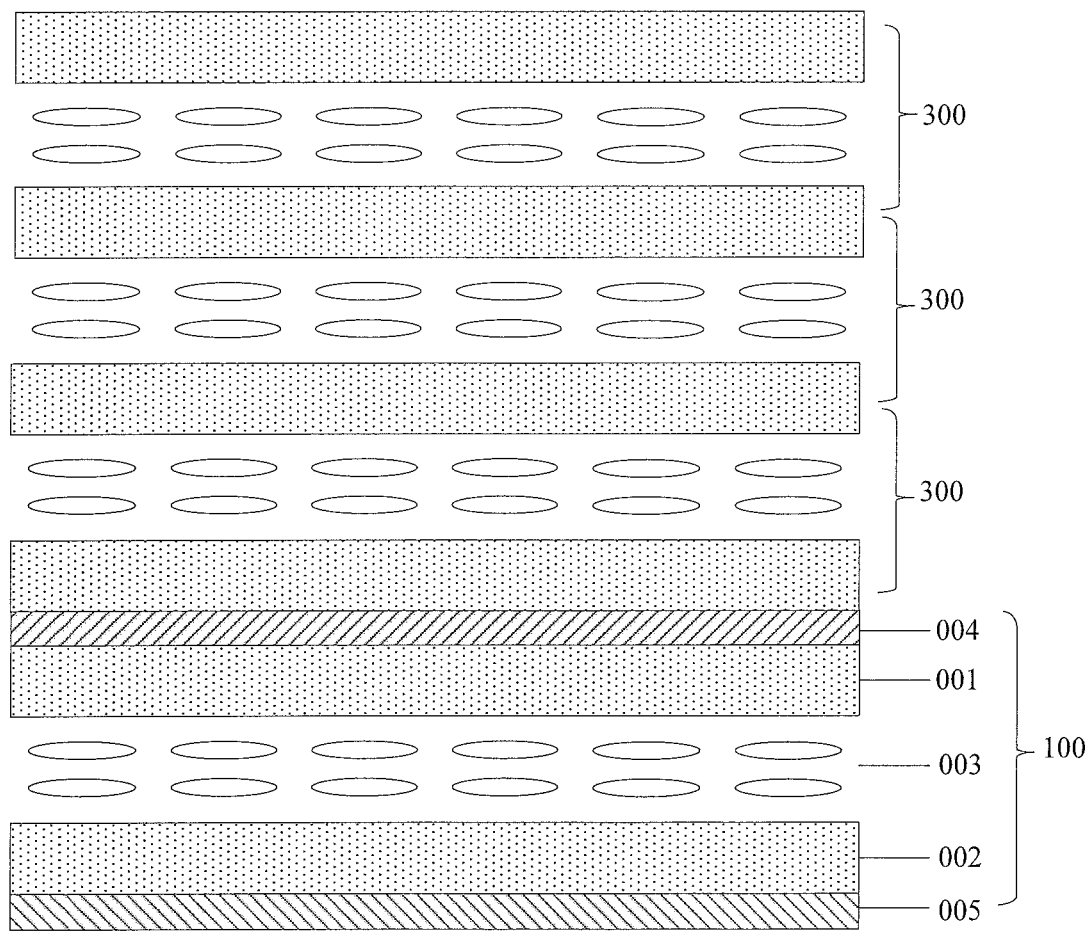
FIG. 8a is a structural schematic view of a virtual curved surface display panel according to another embodiment of the present disclosure.
Figure 8B:
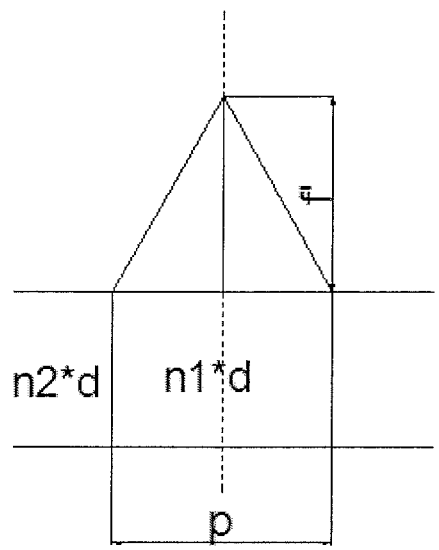
FIG. 8b is an aplanatic principle view of a convex lens.

In some embodiments, the convex lens array or imaging lens array may be formed from a liquid crystal lens. A structural schematic view of a virtual curved surface display panel including a plurality of liquid crystal lenses is illustrated in FIG. 8a. A plurality of layers of liquid crystal lenses 300 are provided and stacked at a light emitting side of the display panel 100. A voltage is applied across both sides of each layer of liquid crystal lenses 300 such that the liquid crystal molecules may be deflected and thus may be equivalent to one or more convex lens arrays 200. As for the liquid crystal lens 300, its focal distance value is associated with a refractive index n to linear polarized light in a deflection state of the liquid crystal molecules, a cell thickness d and diameter P of each lens. As shown in FIG. 8b, a convex lens is taken as an example. It is obtained from an aplanatism principle that $$n_1 d + f' = n_2 d + \sqrt{f'^2 + (p/2)^2}.$$

As $[(n_1-n_2)*d]^2 \approx 0$, the above formula may be simplified as $$f' = \frac{p^2}{8(n_1 - n_2)d},$$

where $n_o \leq n_2 < n_1 \leq n_e$.

Figure 8C:
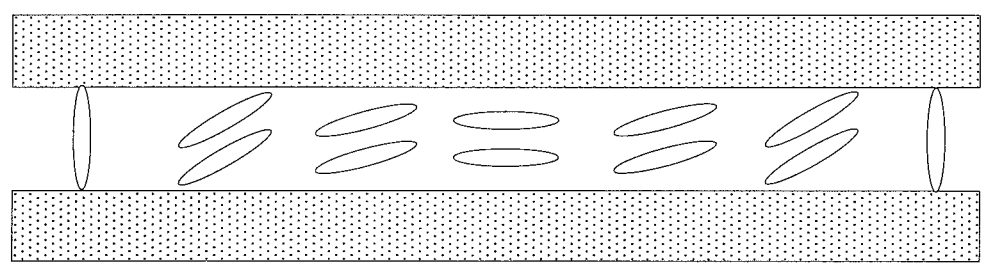
FIG. 8c is a working principle view of a liquid crystal lens.

FIG. 8a illustrates an arrangement state of liquid crystal molecules in multiple layers of liquid crystal lenses in a state where no electrical voltage is applied, that is, in an initial alignment state of the liquid crystal molecules where a major axis of the liquid crystal is parallel to a light transmission axis of an upper polarizer sheet 004 of the display panel 100. In an embodiment of the present disclosure, three layers of liquid crystal lenses are provided as an example, but the number of the liquid crystal lenses included in the virtual curved surface display panel is not limited herein. In practice, larger the number of the layers of the liquid crystal lens is, smoother the displayed virtual curved surface is. FIG. 8c illustrates a deflection state of liquid crystal molecules when a liquid crystal lens is equivalent to a convex lens. When a liquid crystal lens is equivalent to a convex lens, a refractive index of the liquid crystal lens has a minimum value at its edge and a maximum value at its central position, and thus a trajectory of length values of light paths passing through the liquid crystal cello is in a convex surface.

Figure 9A:
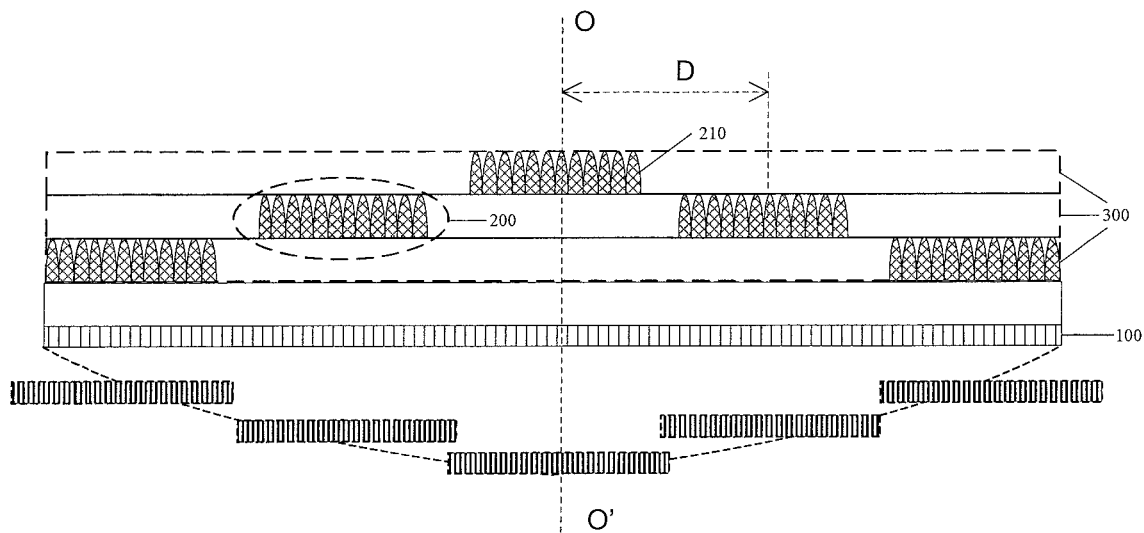
FIG. 9a is a structural schematic view of a virtual curved surface display panel according to a still another embodiment of the present disclosure when achieving a back-position virtual curved surface display.

It is known from the above basis formula of an optical system that an image distance l' for imaging a pixel may be varied at different pixel positions corresponding to different object distances 1 and focal distances f' such that imaging trajectories of the pixels may be arranged in a curved surface when keeping a same magnification ratio β. For example, if a liquid crystal lens is designed to have a focal distance value f'=−2l (an object distance is a negative number), an image distance l'=2l may be obtained from an object-image relationship, and a magnification ratio meets $\beta = 2^x$. Based on this, the multiple layers of liquid crystal lenses 300 may be configured to be equivalent to the plurality of convex lens arrays 200 as shown in FIG. 3a or FIG. 3b. In addition, an applied voltage may be controlled such that each layer of liquid crystal lens 300 may be equivalent to one or more convex lens arrays 200 having a same object distance and each having a plurality of convex lenses 210. In an embodiment, as shown in FIG. 9a, the liquid crystal lens 300 located farthest from the display panel 100 may be equivalent to a convex lens array 200 located at the central position and having a plurality of convex lenses 210; the liquid crystal lens 300 located in the second layer may be equivalent to two convex lens arrays 200 located at either side of the central position and each having a plurality of convex lenses 210; the liquid crystal lens 300 closest to the display panel 100 may be equivalent to two convex lens arrays 200 located at two end sides and each having a plurality of convex lenses 210. In the embodiment where the liquid crystal lenses are configured in the manner as shown in FIG. 9a, the whole focal distance of the convex lens array located at the central position is greater than that of the convex lens arrays located at either side of the convex lens array located at the central position, and the whole focal distance of the convex lens array decreases sequentially as the distance of the convex lens array from the vertical central axis O-O' of the display panel increases. As for convex lenses of each convex lens array, the focal distance of the convex lens increases sequentially as a distance of the convex lens from the vertical central axis is increases.

Figure 9B:
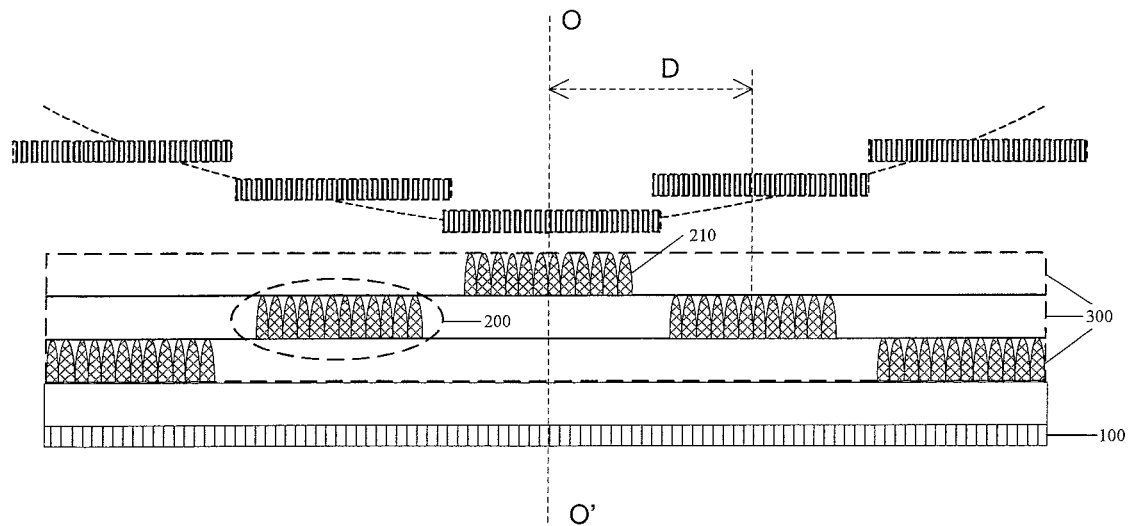
FIG. 9b is a structural schematic view of a virtual curved surface display panel according to a yet still another embodiment of the present disclosure when achieving a front-position virtual curved surface display.

In an embodiment, as shown in FIG. 9b, the liquid crystal lens 300 closest to the display panel 100 may be equivalent to the convex lens array 200 located at the central position and having a plurality of convex lenses 210; the liquid crystal lens 300 located in the second layer may be equivalent to two convex lens arrays 200 located at either side of the central position and each having a plurality of convex lenses 210; the liquid crystal lens 300 located farthest from the display panel 100 may be equivalent to two convex lens arrays 200 located at two end sides and each having a plurality of convex lenses 210. In the embodiment where the liquid crystal lens is configured in the manner as shown in FIG. 9b, the whole focal distance of the convex lens array located at the central position is less than that of the convex lens arrays located at either side of the convex lens array located at the central position, and the whole focal distance of the convex lens array increases sequentially as the distance of the convex lens array from the vertical central axis O-O' of the display panel increases. As for convex lenses of each convex lens array, the focal distance of the convex lens increases sequentially as the distance of the convex lens from the vertical central axis increases.

No matter which manner as shown in FIG. 9a or FIG. 9b is implemented to configure the liquid crystal lens, the region of the liquid crystal lens located outside of the portion of the liquid crystal lens that is equivalent to a convex lens array is in a state where no electrical voltage is applied. In some embodiments, the convex lenses corresponding to sub-pixels in one pixel have a same focal distance. In some embodiments, deflection states of liquid crystal molecules in the liquid crystal lens may be controlled to adjust the focal distance of the liquid crystal lens when the liquid crystal lens is equivalent to a convex lens array.

Embodiments of the present disclosure further provide a display device including the above virtual curved surface display panel according to embodiments of the present disclosure. The display device may be a mobile phone, a flat computer, a television, a display, a notebook computer, a digital photo frame, a navigator, or any other product or component that has a display function. Implementation of the display device may be referred to the above embodiments of the virtual curved surface display panel and is not repeatedly described herein.

Figure 10:
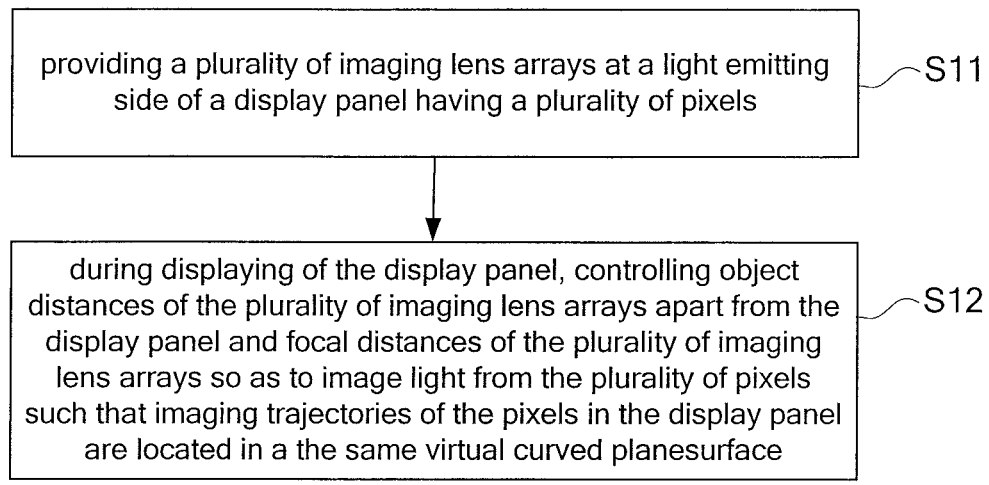
FIG. 10 is a method of implementing a virtual curved surface display by a display panel according to an embodiment of the present disclosure.

Based on the same inventive conception, embodiments of the present disclosure further provide a method of implementing virtual curved surface display on a display panel. As shown in FIG. 10, the method according the embodiment of the present disclosure includes steps of:

S11, providing a plurality of convex lens arrays at a light emitting side of a display panel including a plurality of pixels; and S12, during displaying of the display panel, controlling object distances of the plurality of imaging lens arrays from the display panel and focal distances of the plurality of imaging lens arrays so as to image light from the plurality of pixels such that imaging trajectories of the pixels in the display panel are located in a same virtual curved surface.

In some embodiments, each convex lens arrays comprises a plurality of convex lenses, and object distances from the convex lens arrays to the display panel are distributed in a stepped shape being symmetrical about a vertical central axis of the display panel; convex lenses that are located at either side of and spaced from the vertical central axis by a same distance have a same focal distance, and focal distances of the convex lenses that are spaced from the vertical central axis by different distances are different from one another.

In some embodiments, the focal distance of the convex lens array increases as the object distance of the convex lens array from the display panel increases. In some embodiments where a liquid crystal lens is implemented to be equivalent to a convex lens array, deflection states of liquid crystal molecules in the liquid crystal lens may be controlled to adjust the focal distance of the liquid crystal lens when the liquid crystal lens is equivalent to a convex lens array.

In the virtual curved surface display panel, the display device and the displaying method according to embodiments of the present disclosure, a plurality of imaging lens arrays are disposed at a light emitting side of the display panel having a plurality of pixels and the plurality of imaging lens arrays are arranged to image light from the plurality of pixels such that imaging trajectories or positions of the plurality of pixels in the display panel are located in a same virtual curved surface, thereby enabling a picture displaying effect in a virtual curved surface by a flat display panel. In some embodiment, based on an imaging principle of a convex lens, the plurality of convex lens arrays each having a plurality of convex lenses or the liquid crystal lenses that may be equivalent to a convex lens array are arranged at the light emitting side of the display panel and object distances from the plurality of convex lens arrays to the display panel are distributed in a stepped shape being symmetrical about a vertical central axis of the display panel; convex lenses that are located at either side of and spaced from the vertical central axis by a same distance have a same focal distance and focal distances of the convex lenses that are spaced from the vertical central axis by different distances are different from one another; the focal distance of the convex lens array increases as the object distance of the convex lens array from the display panel increases. In the virtual curved surface display panel according to embodiments of the present disclosure, the focal distance of the convex lens in the convex lens array may be adjusted such that an image distance of an image formed by the pixel in the display panel is varied such that imaging trajectories or positions of the pixel may be arranged or positioned in a virtual curved surface; in some embodiment, a whole focal distance of the convex lens array increases as the object distance of the convex lens array from the display panel increase. Thus, magnification ratios of the convex lens arrays may be maintained to be similar to one another so as to avoid distortion of displayed picture due to overlarge difference among the magnification ratios for different displaying picture regions, thereby improving display effect, achieving a picture displaying effect in a virtual curved surface by a flat display panel and enhancing a visual impact during watching.

Obviously, those skilled in the art can make various modifications and changes to the embodiments in the present disclosure without departing from the spirit and scope of the present disclosure. Thus, these modification and changes of the present disclosure are intended to be included in the present disclosure if they fall within the scope of the present disclosure defined in claims and their equivalents.

What is claimed is:

1. A virtual curved surface display panel comprising:
   a display panel having a plurality of pixels; and
   a plurality of imaging lens arrays disposed at a light emitting side of the display panel and arranged to image light from the plurality of pixels such that imaging trajectories for the plurality of pixels are located in a same virtual curved surface.

2. The virtual curved surface display panel according to claim 1, wherein the imaging lens arrays comprise convex lens arrays each comprising a plurality of convex lenses;
   object distances from the plurality of convex lens arrays to the display panel are distributed in a stepped shape being symmetrical about a vertical central axis of the display panel;
   the convex lenses that are located at either side of the vertical central axis and spaced from the vertical central axis by a same distance have a same focal distance and the focal distances of the convex lenses that are spaced from the vertical central axis by different distance are different from one another; and
   the focal distances of the plurality of convex lens arrays increase as object distances of the plurality of convex lens from the display panel increase.

3. The virtual curved surface display panel according to claim 2, wherein the convex lenses that are located at center positions of respective convex lens arrays have a same magnification ratio.

4. The virtual curved surface display panel according to claim 2, wherein the object distances of the plurality of convex lens arrays from the display panel decrease as distances of the plurality of convex lens arrays from the vertical central axis increase.

5. The virtual curved surface display panel according to claim 4, wherein the object distance of each of the convex lenses from the display panel is smaller than the focal distance of the convex lens.

6. The virtual curved surface display panel according to claim 2, wherein the object distances of the plurality of convex lens arrays from the display panel increase as distances of the plurality of convex lens arrays from the vertical central axis increase.

7. The virtual curved surface display panel according to claim 6, wherein the object distance of each of the convex lenses from the display panel is larger than the focal distance of the convex lens and smaller than two times of the focal distance of the convex lens.

8. The virtual curved surface display panel according to claim 4, wherein the focal distances of the convex lens of each of the convex lens arrays increase sequentially as distances of the convex lens from the vertical central axis increase.

9. The virtual curved surface display panel according to claim 2, wherein each of the convex lens arrays corresponds to at least one of the pixels in the display panel.

10. The virtual curved surface display panel according to claim 9, wherein each pixel of the display panel corresponds to one of the convex lenses of the convex lens arrays.

11. The virtual curved surface display panel according to claim 10, wherein,
    the object distance between each of the convex lenses and the display panel is less than the focal distance of the convex lenses, such that for pixels corresponding to one same convex lens array, a ratio of a width, measured in a direction perpendicular to the vertical central axis, of the pixel to a width, measured in the direction, of a black matrix at either side of the pixel increases as a distance of the pixel from the vertical central axis increases; or
    the object distance between each of the convex lenses and the display panel is greater than the focal distance of the each of the convex lenses, such that for pixels corresponding to one same convex lens array, a ratio of a width, measured in a direction perpendicular to the vertical central axis, of the pixel to a width, measured in the direction, of a black matrix at either side of the pixel decreases as a distance of the pixel from the vertical central axis increases.

12. The virtual curved surface display panel according to claim 9, wherein,
    each of the pixels in the display panel comprises a plurality of sub-pixels each corresponding to at least one of the convex lenses in the convex lens array.

13. The virtual curved surface display panel according to claim 12, wherein, the number of the convex lenses corresponding to each of the sub-pixels is less than or equal to eight.

14. The virtual curved surface display panel according to claim 12, wherein, the convex lenses corresponding to the sub-pixels in one same pixel have a same focal distance.

15. The virtual curved surface display panel according to claim 2, wherein, the imaging lens array comprises a liquid crystal lens, which is equivalent to at least one of the convex lens arrays in a state of being applied with a voltage.

16. A display device comprising the virtual curved surface display panel according to claims 1.

17. A method for performing virtual curved surface display of a display panel, the method comprising steps of:
    providing a plurality of imaging lens arrays at a light emitting side of the display panel having a plurality of pixels; and
    during displaying of the display panel, controlling object distances of the plurality of imaging lens arrays from the display panel and focal distances of the plurality of imaging lens arrays so as to image light from the plurality of pixels such that imaging trajectories of the pixels in the display panel are located in a same virtual curved surface.

18. The method according to claim 17, wherein the step of providing a plurality of imaging lens arrays at a light emitting side of the display panel having a plurality of pixels comprises at least one of providing a plurality of convex lens arrays and providing a liquid crystal lens equivalent to a convex lens array at the light emitting side of the display panel having the plurality of pixels.

19. The method according to claim 18, further comprising:
arranging the plurality of convex lens arrays such that each of the convex lens arrays comprises a plurality of convex lenses, object distances of the plurality of convex lens arrays to the display panel are distributed in a stepped shape being symmetrical about a vertical central axis of the display panel, convex lenses that are located at either side of vertical central axis and spaced from the vertical central axis by a same distance have a same focal distance, and focal distances of the convex lenses that are spaced from the vertical central axis by different distances are different from one another.

20. The method according to claim 18, further comprising:
arranging the plurality of convex lens arrays such that focal distances of the plurality of convex lens arrays increase sequentially as object distances of the plurality of convex lens arrays from the display panel increase.

* * * * *